(12) United States Patent
Wu

(10) Patent No.: US 10,470,069 B2
(45) Date of Patent: Nov. 5, 2019

(54) METHOD OF HANDLING SECONDARY NODE CHANGE IN DUAL CONNECTIVITY

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/993,618

(22) Filed: May 31, 2018

(65) Prior Publication Data

US 2018/0352463 A1    Dec. 6, 2018

Related U.S. Application Data

(60) Provisional application No. 62/513,412, filed on May 31, 2017.

(51) Int. Cl.

| | |
|---|---|
| *H04W 24/10* | (2009.01) |
| *H04W 76/15* | (2018.01) |
| *H04L 12/24* | (2006.01) |
| *H04W 76/27* | (2018.01) |
| *H04W 36/00* | (2009.01) |
| *H04W 88/06* | (2009.01) |

(52) U.S. Cl.
CPC ......... *H04W 24/10* (2013.01); *H04L 41/0816* (2013.01); *H04W 36/0069* (2018.08); *H04W 76/15* (2018.02); *H04W 76/27* (2018.02); *H04W 88/06* (2013.01)

(58) Field of Classification Search
CPC ... H04W 72/042; H04W 76/27; H04W 88/08; H04W 24/10; H04W 76/15; H04W 36/0069; H04L 41/0816
See application file for complete search history.

(56) References Cited

U.S. PATENT DOCUMENTS

| | | | |
|---|---|---|---|
| 2018/0049083 A1* | 2/2018 | Kubota | H04W 72/1215 |
| 2018/0332507 A1* | 11/2018 | Fujishiro | H04J 11/00 |
| 2018/0343659 A1* | 11/2018 | Hahn | H04W 36/00 |

FOREIGN PATENT DOCUMENTS

| | | |
|---|---|---|
| EP | 3101947 A1 | 12/2016 |
| WO | 2016/021821 A1 | 2/2016 |

OTHER PUBLICATIONS

3GPP TS 37.340 V0.1.0 (May 2017) Technical Specification 3rd Generation Partnership Project; Technical Specification Group Radio Access Network; Evolved Universal Terrestrial Radio Access (E-UTRA) and NR; Multi-connectivity; Stage 2 (Release 15), May 2017.
Search Report dated Nov. 13, 2018 for EP application No. 18175184.3, pp. 1-4.
Nokia, Alcatel Lucent Shanghai Bell, ZTE, "Description of EN-DC procedures", 3GPP TSG-RAN WG3 Meeting #96, R3-172014, Hangzhou, P. R. China, May 15-17, 2017, pp. 1-20.
Ericsson, "Procedure for secondary node change", 3GPP TSG-RAN WG2 #97, Tdoc R2-1700920, Athens, Greece, Feb. 13-17, 2017, pp. 1-4.
Office action dated Mar. 21, 2019 for the Taiwan application No. 107118735, filed May 31, 2018, p. 1-13.

* cited by examiner

*Primary Examiner* — Shukri Taha
(74) *Attorney, Agent, or Firm* — Winston Hsu

(57) ABSTRACT

The present invention provides a method and related communication device for handling a secondary node (SN) change in dual connectivity. A target SN receives the latest secondary cell group configuration for a user equipment from a source SN via a master node (MN).

11 Claims, 5 Drawing Sheets

METHOD OF HANDLING SECONDARY NODE CHANGE IN DUAL CONNECTIVITY

CROSS REFERENCE TO RELATED APPLICATIONS

This application claims the benefit of U.S. Provisional Application No. 62/513,412 filed on May 31, 2017, which is incorporated herein by reference.

BACKGROUND OF THE INVENTION

1. Field of the Invention

The present invention relates to a communication device and a method used in a wireless communication system, and more particularly, to a communication device and a method of handling a secondary node change in dual connectivity.

2. Description of the Prior Art

A long-term evolution (LTE) system is developed by the 3rd Generation Partnership Project (3GPP) as a successor of an universal mobile telecommunications system (UMTS), to further enhance performance of the UMTS to satisfy increasing needs of users.

SUMMARY OF THE INVENTION

The present invention therefore provides a method and related communication device for handling a secondary node change in dual connectivity to solve the abovementioned problem.

A network comprising a first base station (BS), a second BS and a third BS, comprises at least one storage device and at least one processing circuit coupled to the at least one storage device. The at least one storage device stores, and the at least one processing circuit is configured to execute instructions of: the first BS connecting to a communication device with a first signalling radio bearer (SRB); the first BS transmitting a first radio resource control (RRC) message on the first SRB to the communication device, wherein the first RRC message comprises a first secondary cell group (SCG) configuration configuring the second BS as a secondary node (SN) such that the communication device is in a dual connectivity with the first BS and the second BS; the second BS transmitting a first measurement configuration on a second SRB to the communication device; the second BS receiving a first measurement report associated to the first measurement configuration on the second SRB from the communication device; the first BS determining a SN change from the second BS to a third BS; the first BS transmitting a first interface message to the second BS in response to the determination; the first BS receiving a second interface message in response to the first interface message from the second BS, wherein the second interface message comprises at least one of the first measurement configuration and a second SCG configuration; the first BS transmitting a SN Addition Request message to the third BS, wherein the SN Addition Request message comprises the at least one of the first measurement configuration and the second SCG configuration; the first BS receiving a SN Addition Request Acknowledge message in response to the SN Addition Request message from the third BS, wherein the SN Addition Request Acknowledge message comprises a third SCG configuration; and the first BS transmitting a second RRC message comprising the third SCG configuration on the first SRB to the communication device while the communication device is in the dual connectivity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
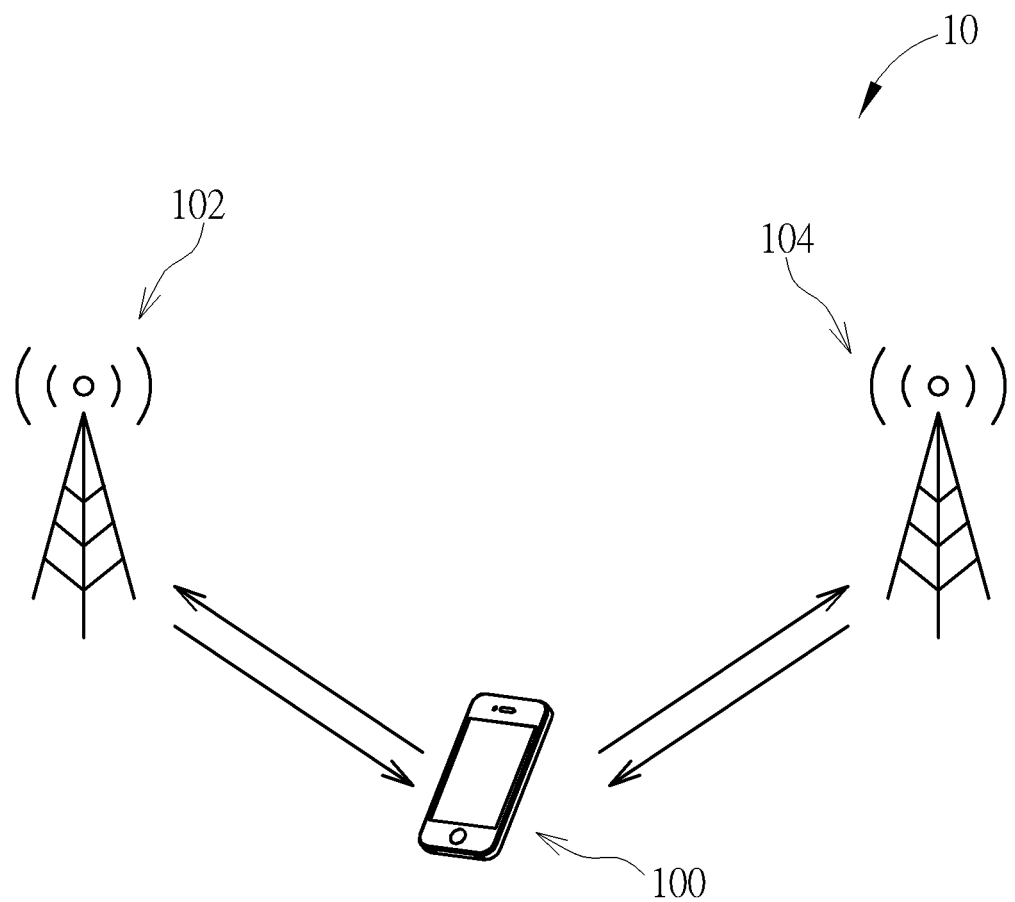
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, a base station (BS) 102 and a BS 104. In FIG. 1, the communication device 100, the BS 102 and the BS 104 are simply utilized for illustrating the structure of the wireless communication system 10. Coverage areas of the BSs 102 and 104 may be partly overlapped.

As shown in FIG. 1, the communication device 100 may be configured to simultaneously connect to the BSs 102 and 104 (i.e., dual connectivity (DC)). That is, the communication device 100 in the DC may perform a transmission/reception via both the BSs 102 and 104. For example, the communication device 100 may receive packets from the BS 102 at a first carrier frequency and the BS 104 at a second carrier frequency, or the communication device 100 may transmit packets to the BS 102 at a first carrier frequency and the BS 104 at a second carrier frequency. In addition, one of the BSs 102 and 104 may be a master node (MN) and the other BS may be a secondary node (SN).

The communication device 100 may be a user equipment (UE), a mobile phone, a laptop, a tablet computer, an electronic book, a portable computer system, a vehicle or an airplane. In addition, for an uplink (UL), the communication device 100 is a transmitter and the BS(s) 102 and/or 104 is a receiver(s), and for a downlink (DL), the BS(s) 102 and/or 104 is a transmitter(s) and the communication device 100 is a receiver.

Figure 2:
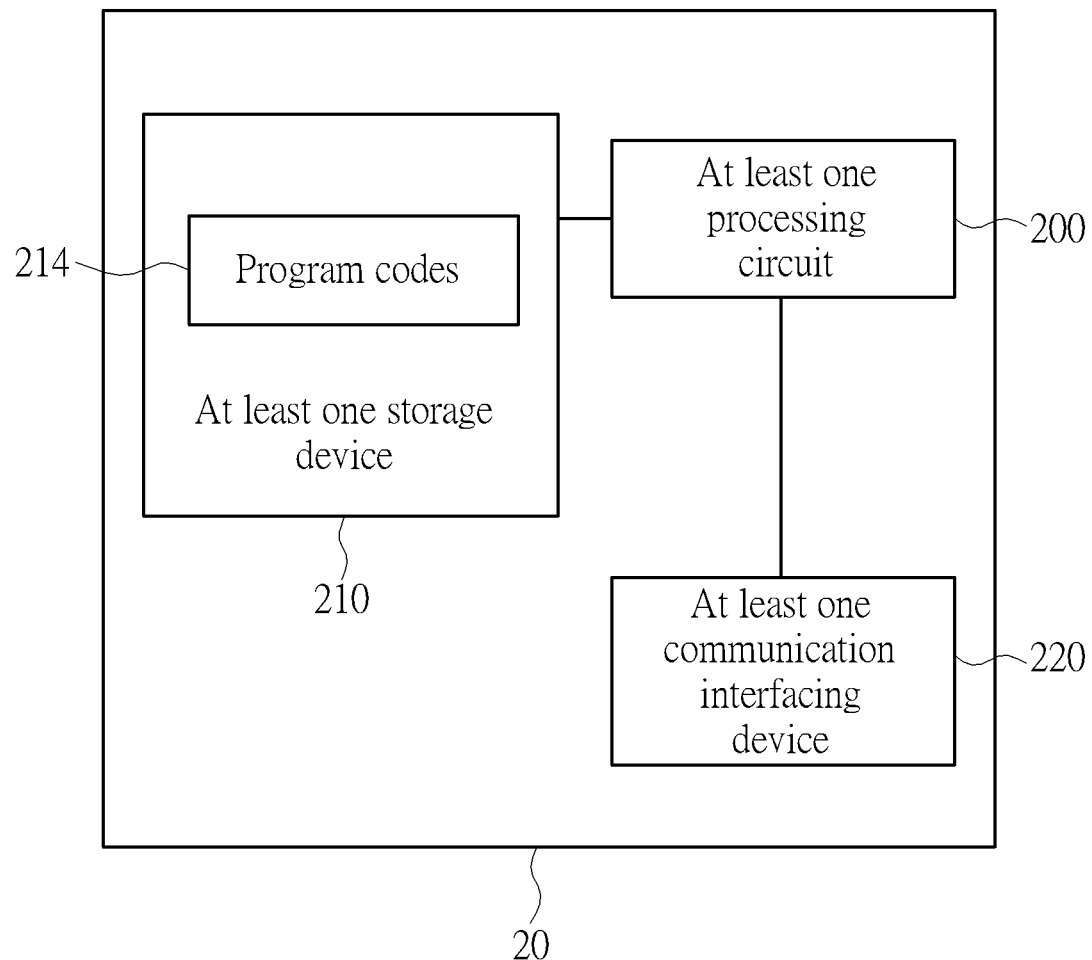
FIG. 2 is a schematic diagram of a communication device according to an example of the present invention.

FIG. 2 is a schematic diagram of a communication device 20 according to an example of the present invention. The communication device 20 may be the communication device 100, the BS(s) 102 and/or 104 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing the communication device 100 in FIG. 1, to simplify the illustration of the embodiments.

Figure 3:
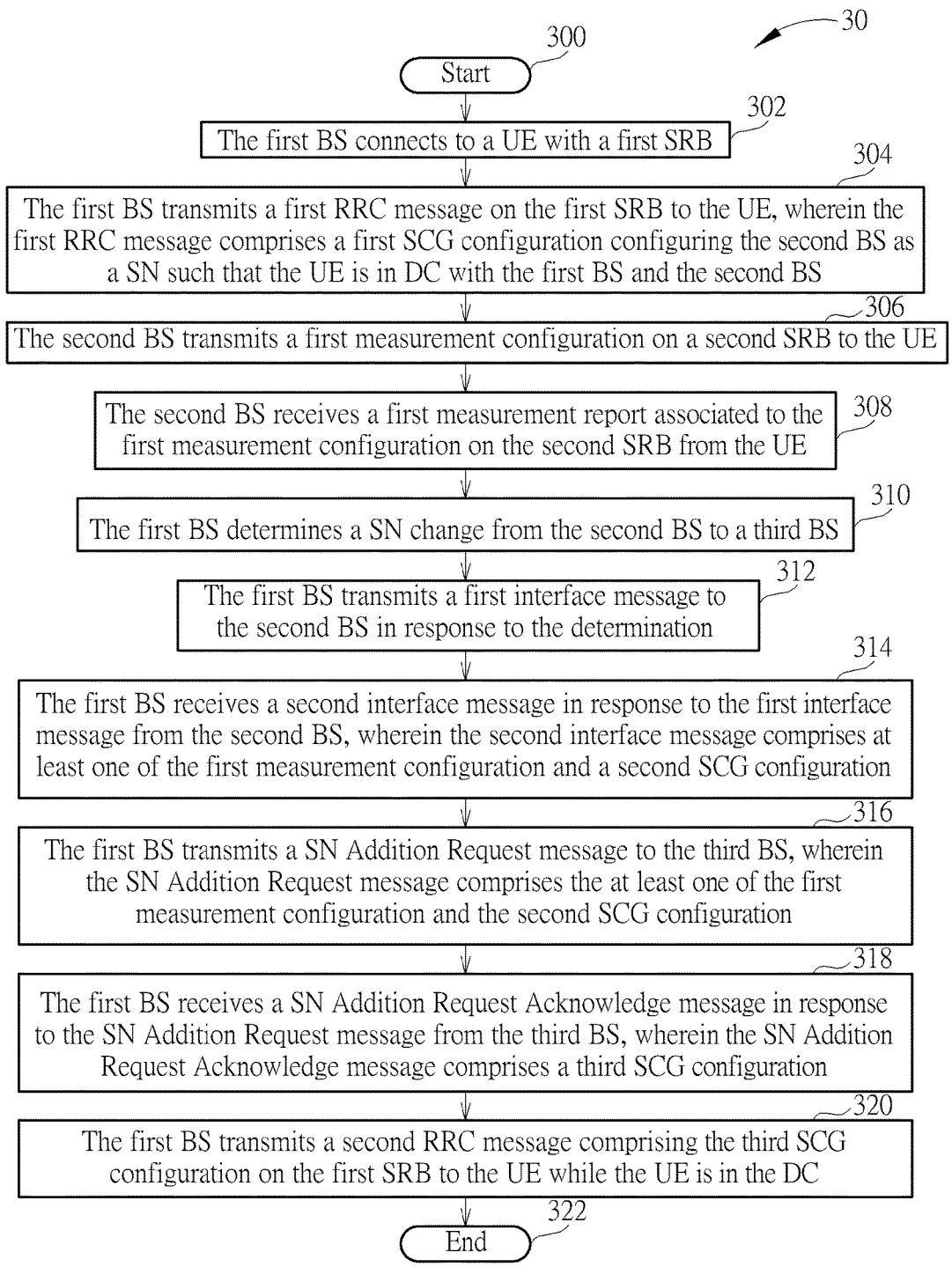
FIG. 3 is a flowchart of a process according to an example of the present invention.

A process 30 in FIG. 3 according to an example of the present invention may be utilized in a first BS (e.g., the BS 102) and a second BS (e.g., the BS 104). The process 30 includes the following steps:

Step 300: Start.

Step 302: The first BS connects to a UE with a first signalling radio bearer (SRB).

Step 304: The first BS transmits a first radio resource control (RRC) message on the first SRB to the UE, wherein the first RRC message comprises a first SCG configuration configuring the second BS as a SN such that the UE is in DC with the first BS and the second BS.

Step 306: The second BS transmits a first measurement configuration on a second SRB to the UE.

Step 308: The second BS receives a first measurement report associated to the first measurement configuration on the second SRB from the UE.

Step 310: The first BS determines a SN change from the second BS to the third BS.

Step 312: The first BS transmits a first interface message to the second BS in response to the determination.

Step 314: The first BS receives a second interface message in response to the first interface message from the second BS, wherein the second interface message comprises at least one of the first measurement configuration and a second secondary cell group (SCG) configuration.

Step 316: The first BS transmits a SN Addition Request message to the third BS, wherein the SN Addition Request message comprises the at least one of the first measurement configuration and the second SCG configuration.

Step 318: The first BS receives a SN Addition Request Acknowledge message in response to the SN Addition Request message from the third BS, wherein the SN Addition Request Acknowledge message comprises a third SCG configuration.

Step 320: The first BS transmits a second RRC message comprising the third SCG configuration on the first SRB to the UE while the UE is in the DC.

Step 322: End.

In one example, the second BS generates the first SCG configuration and transmits the first SCG configuration to the first BS. In one example, the first SCG configuration configures how the UE communicates with the second BS.

In one example, the first SCG configuration, the second SCG configuration and/or the third SCG configuration may include at least one of a frame structure configuration, a time division multiplexing (TDD) configuration, a physical cell identity (PCI), carrier information, a temporary identifier (e.g., Cell Radio Network Temporary Identifier (C-RNTI)) assigned to the UE, a physical layer configuration (e.g., for physical channel(s), a transmission mode, a reference signal, a channel state information reporting, etc.), a medium access control (MAC) configuration and at least one radio bearer (RB) configuration.

In one example, the at least one RB configuration may include a SRB configuration and/or a data radio bearer (DRB) configuration. Each of the at least one RB configuration may include at least one of a RB identity and a radio link control (RLC) configuration. The SRB configuration may configure the second SRB to the UE. The DRB configuration may configure a SCG part of a DRB (e.g., MCG split bearer), a DRB of a SCG bearer or a DRB of a SCG split bearer. The RB configuration may or may not include a PDCP configuration.

In one example, the second SCG configuration may not include the SRB configuration such that the UE keeps using the SRB configuration received from/configured by the second BS in the first SCG configuration. The second SCG configuration may not include the DRB configuration such that the UE keeps using the DRB configuration received from/configured by the second BS in the first SCG configuration.

In one example, the first SCG configuration is different from the second SCG configuration. The second SCG configuration may have at least one configuration different from that in the first SCG configuration. In one example, the at least one configuration includes the physical layer configuration, the MAC configuration, the frame structure configuration, the PCI and/or the carrier information. The second BS may transmit the at least one configuration on the second SRB to the UE, but the first BS does not know the at least one configuration, e.g., the first BS may receive old value(s) of the at least one configuration or never receive the at least one configuration. Similarly, the first BS does not know the first measurement configuration. Thus, the first BS can get the latest SCG configuration (i.e., the second SCG configuration) and the first measurement configuration from the second BS, and can transmit them in the second SCG configuration to the third BS. The frame structure configuration may configure a TDD UL/DL slot (e.g., frame structure/format) or a TDD UL/DL symbol (e.g., slot structure/format).

In one example, the third SCG configuration may not include the SRB configuration such that the UE keeps using the SRB configuration received from/configured by the second BS in the second SCG configuration. The third SCG configuration may not include the DRB configuration such that the UE keeps using the DRB configuration received from/configured by the second BS in the second SCG configuration.

In one example, the third SCG configuration may have at least one configuration different from the second SCG configuration. In one example, the at least one configuration include the physical layer configuration, the MAC configuration, the frame structure configuration, the physical cell identity and/or the carrier information.

In one example, the third BS generates the third SCG configuration in response to the SN Addition Request message or according to the second SCG configuration.

In one example, the first RRC message includes the DRB configuration instead of the first SCG configuration. In one example, the second RRC message includes the DRB configuration instead of the third SCG configuration.

In one example, the first interface message explicitly or implicitly requests the at least one of the second SCG configuration and the first measurement configuration. In one example, the first interface message is a message specifically for requesting the second SCG configuration. In one example, the first interface message is a message not only for requesting the second SCG configuration but also for other purpose(s).

In one example, the first interface message is a SN Change Indication message, a SN Release Request message, a SN Configuration Enquiry message, a Retrieve UE Context Request message or a SN Modification Request message. In one example, the second interface message is a SN Change Confirm message, a SN Change Response message, a SN Modification Request Acknowledge message, a SN Change Request message, a SN Change Required message, a SN Configuration Confirm message, a SN Configuration Information or a Retrieve UE Context Response message.

In one example, the second BS stops configuring a new configuration to the UE and stops reconfiguring (e.g., changing) a configuration of the UE on the second SRB, in response to the first interface message. Thus, the second SCG configuration is not updated during the SN change.

In one example, the first SRB is a MCG bearer or a MCG split bearer. The second SRB may be a SCG bearer or a SCG split bearer. In one example, the first SRB is a SRB 1 which is the MCG bearer or the MCG split bearer. The second SRB may be a SRB 3 which is the SCG bearer or the SCG split bearer.

In one example, the first BS configures a second measurement configuration to the UE. For example, the first BS transmits the second measurement configuration on the first SRB to the UE. The first BS may receive a second measurement report associated to the second measurement configuration, from the UE on the first SRB. The first BS may or may not include the second measurement configuration in the SN Addition Request message.

In one example, the third BS may or may not include a third measurement configuration in the SN Addition Request Acknowledge message.

Figure 4:
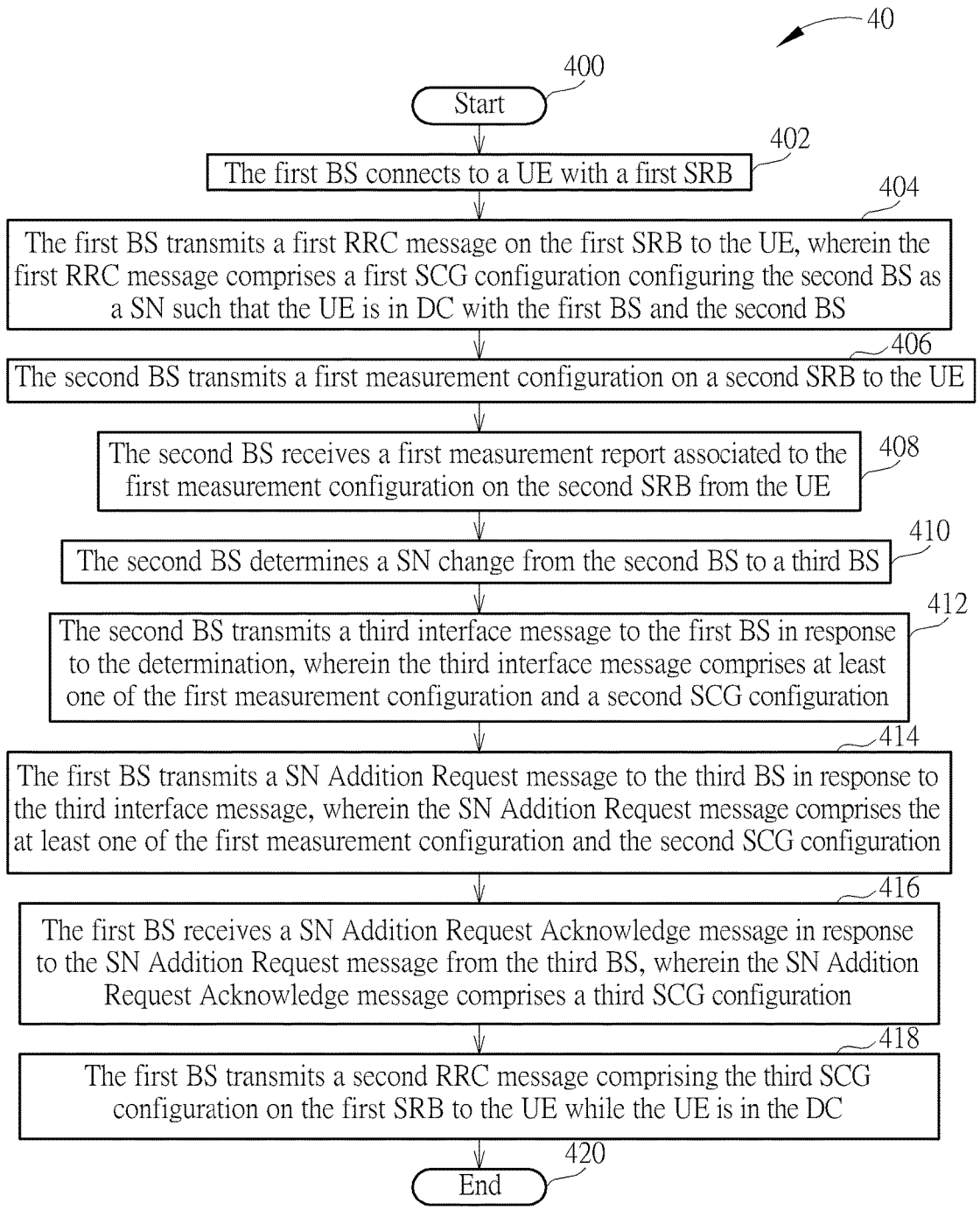
FIG. 4 is a flowchart of a process according to an example of the present invention.

A process 40 in FIG. 4 according to an example of the present invention may be utilized in a first BS (e.g., the BS 102) and a second BS (e.g., the BS 104). The process 40 includes the following steps:

Step 400: Start.

Step 402: The first BS connects to a UE with a first SRB.

Step 404: The first BS transmits a first RRC message on the first SRB to the UE, wherein the first RRC message comprises a first SCG configuration configuring the second BS as a SN such that the UE is in DC with the first BS and the second BS.

Step 406: The second BS transmits a first measurement configuration on a second SRB to the UE.

Step 408: The second BS receives a first measurement report associated to the first measurement configuration on the second SRB from the UE.

Step 410: The second BS determines a SN change from the second BS to the third BS.

Step 412: The second BS transmits a third interface message to the first BS in response to the determination, wherein the third interface message comprises at least one of the first measurement configuration and a second SCG configuration.

Step 414: The first BS transmits a SN Addition Request message to the third BS in response to the third interface message, wherein the SN Addition Request message comprises the at least one of the first measurement configuration and the second SCG configuration.

Step 416: The first BS receives a SN Addition Request Acknowledge message in response to the SN Addition Request message from the third BS, wherein the SN Addition Request Acknowledge message comprises a third SCG configuration.

Step 418: The first BS transmits a second RRC message comprising the third SCG configuration on the first SRB to the UE while the UE is in the DC.

Step 420: End.

In one example, the first BS transmits a SN Release Request message (or called SN Change Confirm message) to the second BS in response to the SN Addition Request Acknowledge message.

In one example, the second BS stops configuring a new configuration to the UE and stops reconfiguring (e.g., changing) a configuration of the UE on the second SRB, in response to the determination or transmission of the third interface message. Thus, the second SCG configuration is not updated during the SN change.

In one example, the third interface message may be a SN Change Required message or a SN Change Request message.

The examples described for the process 30 may be applied to the process 40, and are not repeated herein.

The examples described below may be applied to any of the above processes.

In one example, the first measurement configuration configures the UE to measure a first carrier and the second measurement configuration configures the UE to measure a second carrier different from the first carrier. For example, the first measurement configuration includes/indicates a first Absolute Radio Frequency Channel Number (ARFCN) identifying the first carrier, and the second measurement configuration includes/indicates a second ARFCN identifying the second carrier. The first carrier and the second carrier may be same or different. The first ARFCN and the second ARFCN may be same or different. "carrier" may be replaced by "frequency" or "carrier frequency".

In one example, the measurement configuration above configures a reporting configuration specifying a reporting criterion (e.g., a periodic reporting or an event type). The first measurement configuration and the second measurement configuration may have the same criterion or different reporting criterions.

In one example, the first RRC message (e.g., RRCConnectionReconfiguration) is generated by the first BS or the second BS. The UE may transmit the first RRC response message on the first SRB to the first BS or to the second BS via the first BS on the first SRB, in response to the first RRC message. In one example, the second BS generates the first RRC message, and forwards the first RRC message to the first BS. The first BS may encapsulate the first RRC message in a RRC message (e.g., RRCConnectionReconfiguration, SCGReconfiguration, SCGReconfiguration or SCGReconfigurationCommand), and may transmit the RRC message to the UE on the first SRB. The UE may transmit a RRC response message (e.g., RRCConnectionReconfigurationComplete, SCGReconfigurationComplete, SCGReconfigurationComplete or SCGReconfigurationCommandComplete) on the first SRB to the first BS, in response to the RRC message. The RRC response message may or may not include the first RRC response message. In case that the first RRC response is included in the RRC response message, the first BS may forward the first RRC response to the second BS.

In one example, the second RRC message (e.g., RRCConnectionReconfiguration) is generated by the first BS or the third BS. The UE may transmit the second RRC response message on the first SRB to the first BS or to the third BS via the first BS on the first SRB, in response to the second RRC message. In one example, the third BS generates the second RRC message, and forwards the second RRC message to the first BS. The first BS may encapsulate the second RRC message in a RRC message (e.g., RRCConnectionReconfiguration, SCGReconfiguration, SCGReconfiguration or SCGReconfigurationCommand), and may transmit the RRC message to the UE on the first SRB. The UE may transmit a RRC response message (e.g., RRCConnectionReconfigurationComplete, SCGReconfigurationComplete, SCGReconfigurationComplete or SCGReconfigurationCommandComplete) on the first SRB to the first BS, in response to the RRC message. The RRC response message may or may not include the second RRC response message. In case that the second RRC response is included in the RRC response message, the first BS may forward the second RRC response to the third BS.

In one example, the first measurement configuration is generated by the second BS. In one example, the first measurement configuration is included in the first RRC message. In one example, the first measurement configuration is included in a third RRC message (e.g., RRCReconfiguration) generated by the second BS and is transmitted by the second BS on the second SRB to the UE, while the UE is in the DC with the first BS and the second BS. In response to the third RRC message, the UE may transmit a third RRC response message (e.g., RRCReconfigurationComplete) on the second SRB to the second BS.

In one example, the at least one configuration in the second SCG configuration is generated by the second BS. In one example, the at least one configuration is included in the first RRC message. In one example, the at least one configuration is included in a third RRC message (e.g., RRCReconfiguration) generated by the second BS and is transmitted by the second BS on the second SRB to the UE, while the UE is in the DC with the first BS and the second BS. In response to the third RRC message, the UE may transmit a third RRC response message (e.g., RRCReconfigurationComplete) on the second SRB to the second BS.

In one example, the second measurement configuration is generated by the first BS. The second measurement configuration may be included in a fourth RRC message (e.g., RRCConnectionReconfiguration) which is generated and transmitted to the UE by the first BS on the first SRB. The UE may transmit the fourth RRC response message (e.g., RRCConnectionReconfigurationComplete) on the first SRB to the first BS in response to the fourth RRC message. In one example, the second measurement configuration is received by the first BS and the UE from a fourth BS. The first BS may implicitly configure the second measurement configuration to the UE by making the UE keep using the second measurement configuration in a handover command.

In one example, the first BS is an evolved Node-B (eNB) or a next-generation eNB (ng-eNB), the second BS is a next generation NB (gNB) and the third BS is a gNB. In one example, the first BS is a gNB, the second BS is an eNB or a ng-eNB and the third BS is an eNB or a ng-eNB. The first BS may be a MN. In one example, the first BS, the second BS and the third BS are gNBs. In the present invention, the message names are simply examples, and should not be treated as limitations for realizing the present invention.

In one example, the UE sets up the first SRB in response to a RRC connection establishment procedure. In one example, the UE performs the RRC connection establishment procedure by transmitting a RRCConnectionRequest message to a BS (e.g., the first BS or the fourth BS). The BS may transmit a RRCConnectionSetup message configuring the first SRB to the UE in response to the RRCConnectionRequest message.

In one example, the UE may set up the second SRB in response to the first RRC message. That is, the first RRC message configures the second SRB.

In one example, after the UE successfully performs the SN change to the third BS (i.e., connects to the third BS) according to the third SCG configuration, the UE transmits a third measurement report associated to the first measurement configuration on the second SRB to the third BS.

In one example, the first BS determines the SN change from the second BS to the third BS in response to the second measurement report. In one example, the second BS may determine the SN change from the second BS to the third BS in response to the first measurement report.

It should be noted that although the above examples are illustrated to clarify the related operations of corresponding processes. The examples can be combined and/or modified arbitrarily according to system requirements and/or design considerations.

Figure 5:
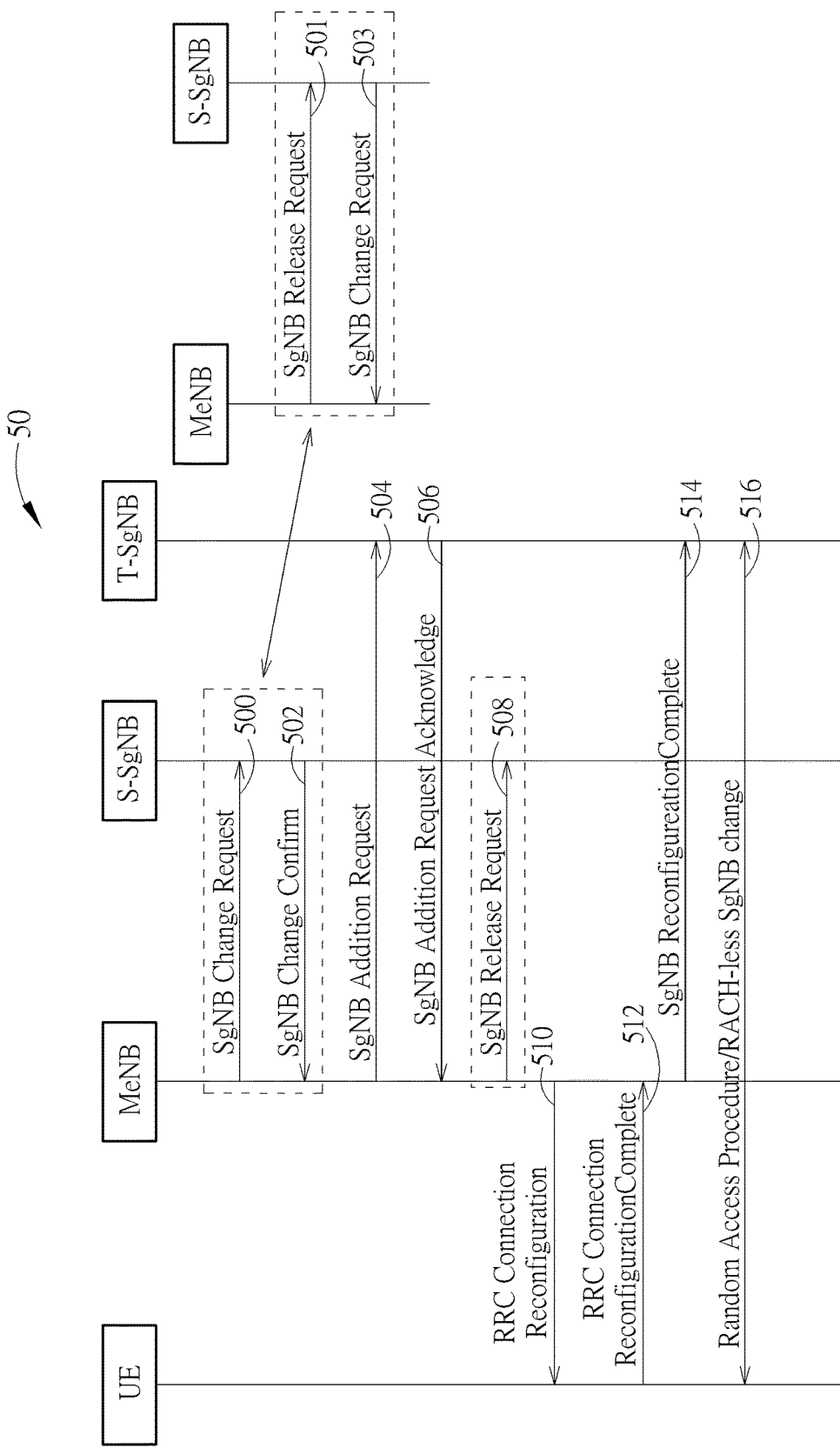
FIG. 5 is a procedure of changing a SgNB according to an example of the present invention.

FIG. 5 is a procedure 50 of changing a SgNB according to an example of the present invention. Interactions between a UE, a MeNB, a MeNB, a source SgNB (S-SgNB) and a target SgNB (T-SgNB) are described as follows. The MeNB determines a change of a SgNB from the S-SgNB to the T-SgNB for the UE. The MeNB transmits a SgNB Change Request message to the S-SgNB in response to the determination (Step 500), and accordingly, receives a SgNB Change Confirm message from the S-SgNB (Step 502). The SgNB Change Confirm message may include at least one of the latest SCG configuration and measurement configuration(s) of the S-SgNB configured to the UE. The latest SCG configuration (i.e., the second SCG configuration) may include a configuration configured by the S-SgNB to the UE on the second SRB (as described in the process 30). The measurement configuration(s) are configured by the S-SgNB to the UE on the second SRB.

Then, the MeNB transmits a SgNB Addition Request message to the T-SgNB (Step 504), receives a SgNB Addition Request Acknowledge message from the T-SgNB (Step 506), and accordingly, and transmits a SgNB Release Request message to the S-SgNB (Step 508). The MeNB transmits a RRC Connection Reconfiguration message to the UE (Step 510), and accordingly, receives a RRC Connection ReconfigurationComplete message from the UE (Step 512). Then, the MeNB transmits a SgNB ReconfigurationComplete message to the T-SgNB (Step 514), and transmits a Random Access Procedure/RACH-less SgNB change message to the UE (Step 516).

In another example, instead of Steps 500 and 502, the MeNB transmits a SgNB Release Request message to the S-SgNB first (Step 501), and accordingly, receives a SgNB Change Request message from the S-SgNB (Step 503). In this case, Step 508 is not performed.

Those skilled in the art should readily make combinations, modifications and/or alterations on the abovementioned steps, description and examples. Some steps described above may not be necessary for realizing the present invention. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program codes 214. For the process(es) involving the first BS and second BS, the steps performed by the first BS may be compiled into the program codes 214 of the first BS and the steps performed by the second BS may be compiled into the program codes 214 of the second BS.

To sum up, the present invention provides a method and related communication device for handling a SN change in DC. A target SN may receive the latest SCG configuration from a source SN via a MN. As a result, performance of the SN change for the UE is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network comprising a first base station (BS), a second BS and a third BS, comprising:
   at least one storage device; and
   at least one processing circuit, coupled to the at least one storage device, wherein the at least one storage device stores, and the at least one processing circuit is configured to execute instructions of:
   the first BS connecting to a communication device with a first signalling radio bearer (SRB);
   the first BS transmitting a first radio resource control (RRC) message on the first SRB to the communication device, wherein the first RRC message comprises a first secondary cell group (SCG) configuration configuring the second BS as a secondary node (SN) such that the communication device is in a dual connectivity with the first BS and the second BS;
   the second BS transmitting a first measurement configuration on a second SRB to the communication device;
   the second BS receiving a first measurement report associated to the first measurement configuration on the second SRB from the communication device;
   the first BS determining a SN change from the second BS to the third BS;
   the first BS transmitting a first interface message to the second BS in response to the determination;
   the first BS receiving a second interface message in response to the first interface message from the second BS, wherein the second interface message comprises at least one of the first measurement configuration and a second SCG configuration;
   the first BS transmitting a SN Addition Request message to the third BS, wherein the SN Addition Request message comprises the at least one of the first measurement configuration and the second SCG configuration;
   the first BS receiving a SN Addition Request Acknowledge message in response to the SN Addition Request message from the third BS, wherein the SN Addition Request Acknowledge message comprises a third SCG configuration; and
   the first BS transmitting a second RRC message comprising the third SCG configuration on the first SRB to the communication device while the communication device is in the dual connectivity.

2. The network of claim 1, wherein the first SCG configuration is different from the second SCG configuration.

3. The network of claim 1, wherein the instructions further comprise:
   the third BS generating the third SCG configuration in response to the SN Addition Request Acknowledge message or according to the second SCG configuration.

4. The network of claim 1, wherein the instructions further comprise:
   the second BS stopping configuring a new configuration to the communication device and stopping reconfiguring a configuration of the communication device on the second SRB, in response to the first interface message.

5. The network of claim 1, wherein the instructions further comprise:
   the first BS configuring a second measurement configuration to the communication device by transmitting the second measurement configuration on the first SRB to the communication device; and
   the first BS receiving a second measurement report associated to the second measurement configuration, from the communication device on the first SRB.

6. A network comprising a first base station (BS), a second BS and a third BS, comprising:
   at least one storage device; and
   at least one processing circuit, coupled to the at least one storage device, wherein the at least one storage device stores, and the at least one processing circuit is configured to execute instructions of:
   the first BS connecting to a communication device with a first signalling radio bearer (SRB);
   the first BS transmitting a first radio resource control (RRC) message on the first SRB to the communication device, wherein the first RRC message comprises a first secondary cell group (SCG) configuration configuring the second BS as a secondary node (SN) such that the communication device is in a dual connectivity with the first BS and the second BS;
   the second BS transmitting a first measurement configuration on a second SRB to the communication device;
   the second BS receiving a first measurement report associated to the first measurement configuration on the second SRB from the communication device;
   the second BS determining a SN change from the second BS to the third BS;
   the second BS transmitting an interface message to the first BS in response to the determination, wherein the interface message comprises at least one of the first measurement configuration and a second SCG configuration;
   the first BS transmitting a SN Addition Request message to the third BS in response to the interface message, wherein the SN Addition Request message comprises the at least one of the first measurement configuration and the second SCG configuration;
   the first BS receiving a SN Addition Request Acknowledge message in response to the SN Addition Request message from the third BS, wherein the SN Addition Request Acknowledge message comprises a third SCG configuration; and
   the first BS transmitting a second RRC message comprising the third SCG configuration on the first SRB to the communication device while the communication device is in the dual connectivity.

7. The network of claim 6, wherein the instructions further comprise:
   the first BS transmitting a SN Release Request message to the second BS in response to the SN Addition Request Acknowledge message.

8. The network of claim 6, wherein the instructions further comprise:
   the second BS stopping configuring a new configuration to the communication device and stopping reconfiguring a configuration of the communication device on the second SRB, in response to the determination or the transmission of the third interface message.

9. The network of claim 6, wherein the first RRC message configures the second SRB.

10. The network of claim 6, wherein the first SCG configuration is different from the second SCG configuration.

11. The network of claim 6, wherein the instructions further comprise:
   the third BS generating the third SCG configuration in response to the SN Addition Request Acknowledge message or according to the second SCG configuration.

* * * * *